United States Patent [19]

Domborwski et al.

[11] Patent Number: 5,100,353
[45] Date of Patent: Mar. 31, 1992

[54] ELECTROMAGNETIC MARKER FLOAT RELEASE

[75] Inventors: James H. Domborwski, Carlsbad; William H. Marn, San Diego, both of Calif.

[73] Assignee: The United States of America as represented by the Secretary of the Navy, Washington, D.C.

[21] Appl. No.: 597,975

[22] Filed: Oct. 15, 1990

[51] Int. Cl.[5] ............................................. B63B 22/16
[52] U.S. Cl. .......................................... 441/6; 441/2; 441/23
[58] Field of Search ................. 441/2, 6, 7, 10, 22–28; 116/204, 209, 228; 24/602; 367/133, 131

[56] References Cited

U.S. PATENT DOCUMENTS

| | | | |
|---|---|---|---|
| 4,262,379 | 4/1981 | Jankiewicz | 441/2 |
| 4,664,559 | 5/1987 | Berrang | 441/2 X |
| 4,731,036 | 3/1988 | Ulf | 441/23 |

Primary Examiner—Ed Swinehart
Attorney, Agent, or Firm—Harvey Fendelman; Thomas Glenn Keough; Michael A. Kagan

[57] ABSTRACT

The present invention provides a marker float release that includes a housing; an electromagnet mounted to the housing having an electromagnetic core; and a buoyant element having a permanent magnet. The buoyant element is positioned against the housing so that the permanent magnet is magnetically attracted to the electromagnetic core with sufficient force to hold the buoyant element adjacent to the housing when the housing and the buoyant element are submerged in water by inducing a magnetic field in the electromagnetic core. A flexible line having one end attached to the buoyant element and another end attached to the housing links the buoyant element to the housing. Magnetic field reversing means is operably coupled to the electromagnet for selectively reversing the magnetic field of the electromagnetic core, thereby permitting the buoyant element to be released from the housing.

6 Claims, 1 Drawing Sheet

5,100,353

ELECTROMAGNETIC MARKER FLOAT RELEASE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to the field of underwater marker buoy release systems, and more particularly to an electromagnetic marker buoy release.

There are many applications that require objects to be implanted upon the ocean floor, as for example, lobster traps, or underwater sensors. To facilitate eventual recovery of these objects, buoys are often used to mark the positions of such objects. However, buoys draw attention to the objects and make them vulnerable to being purloined or tampered with. To minimize these problems, the objects may include mechanisms for releasing a buoy after a predetermined period of time, or after the performance of some function.

Different types of buoy releases have been employed for this purpose, as for example, mechanical, explosive link, or corrodible link systems. However, each of these types have drawbacks.

The mechanical systems generally consist of some type of sliding or levered actuator which performs the release function. These systems tend to be relatively costly because they have many parts, some of which require precision tolerances. Another disadvantage of this type of system results from exposure to sea water which can eventually cause binding of the release mechanism due to organic growth or corrosion of the mechanism.

The explosive link systems utilize an explosive bolt or charge to break the connection between the float and the submerged object. For safety reasons, these types of devices require careful handling by specially trained personnel. Furthermore, systems incorporating explosive links can present a safety hazard if they inadvertently fire.

The simple corrosive link release system relies on sea water to corrode the connecting link until the marker is released. This type of release is dependent upon several factors including water temperature, water salinity, and water current flow across the link. Although these environmental factors may be accommodated by designing a corrodable link so that it may release within a predetermined period of time after deployment, these links cannot be used to signal completion of a process or a system failure.

SUMMARY OF THE INVENTION

The present invention provides a marker float release that overcomes the shortcomings of conventional marker float release systems and includes a housing; an electromagnet mounted to the housing having an electromagnetic core; and a buoyant element having a permanent magnet. The buoyant element is positioned against the housing so that the permanent magnet is magnetically attracted to the electromagnetic core with sufficient force to hold the buoyant element adjacent to the housing when the housing and the buoyant element are submerged in water by inducing a magnetic field in the electromagnetic core. A flexible line having one end attached to the buoyant element and another end attached to the housing links the buoyant element to the housing. Magnetic field reversing means is operably coupled to the electromagnet for selectively reversing the magnetic field of the electromagnetic core, thereby repeling the permanent magnet and permitting the buoyant element to be released from the housing.

Thus it can be readily appreciated that one advantage of the present invention is that it provides a marker float release system that operates without any moving parts. Another advantage of the present invention is that it is not susceptible to fouling by corrosion or marine life.

DESCRIPTION OF THE PREFERRED EMBODIMENT

Figure 1:
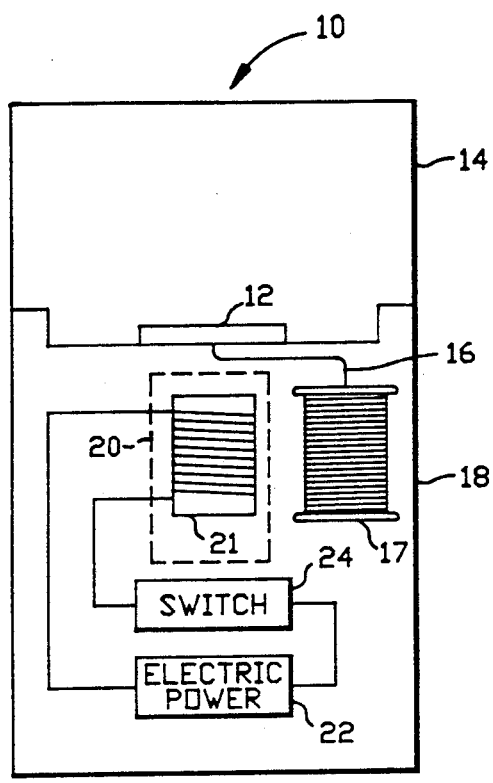
FIG. 1 is a schematic view of one embodiment of the electromagnetic marker float release of the present invention.
Figure 2:
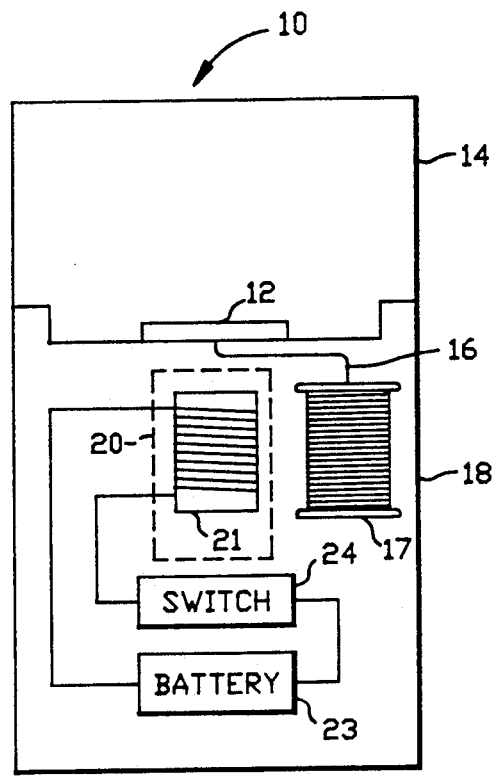
FIG. 2 is schematic view of a second embodiment of the electromagnetic marker float release of the present invention.
Figure 3:
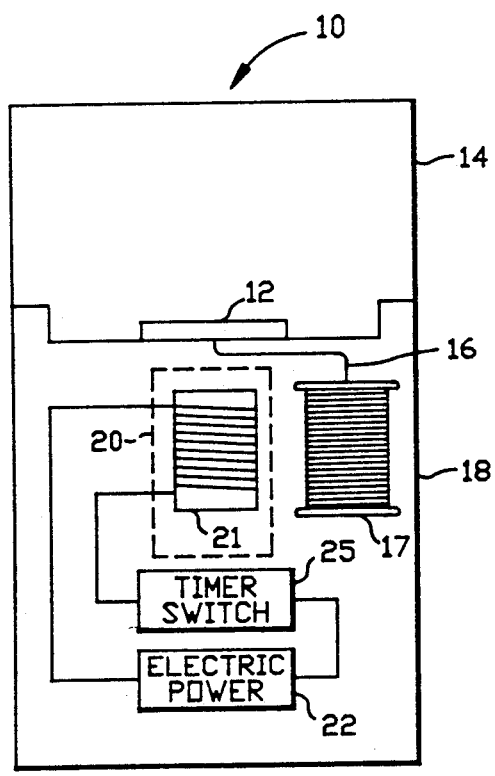
FIG. 3 is schematic view of a third embodiment of the electromagnetic marker float release of the present invention.
Figure 4:
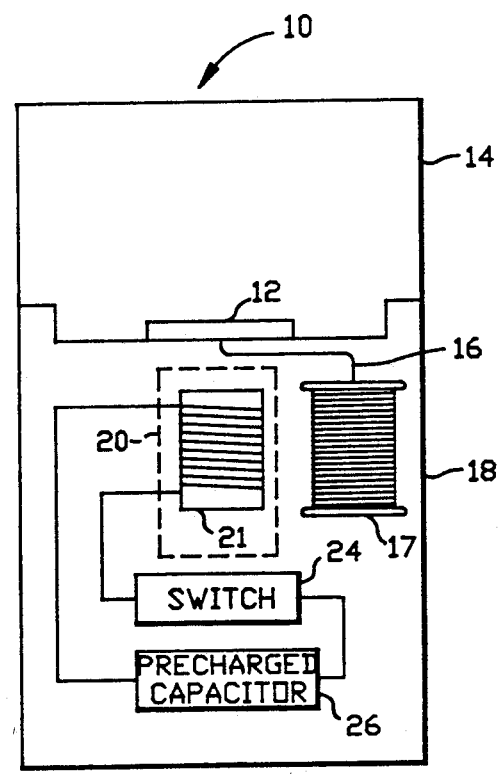
FIG. 4 is schematic view of a third embodiment of the electromagnetic marker float release of the present invention.

Referring to FIG. 1, electromagnetic marker float release system 10 includes permanent magnet 12 secured to buoyant float 14 which may be fabricated of materials such as styrofoam or plastic. Flexible line 16 is coiled around spool 17, secured within housing 18, and links float 14 to housing 18. In the preferred embodiment, line 16 would be neutrally buoyant. Housing 18 may be fabricated of polymeric tubing, such as polyvinyl chloride or ABS. Electromagnet 20, having electromagnetic core 21, is mounted to housing 18 and is operably coupled in series to electrical power supply 22 which may, for example, be a battery 23 positioned within housing 18, as shown in FIG. 2, or an electrical power source remote from system 10 linked to electromagnet 20 by electrical cable, not shown. Electrical power to energize electromagnet 20 could also be provided by a pre-charged capacitor 26, as shwon in FIG. 4, not shown, with or without a battery backup, as are well known by those skilled in this field of technology. The energy storage capacities of such capacitors and batteries would depend upon the length of time the capacitor would be required to hold a charge. A normally open electrical switch 24 is connected in series between power supply 22 and electromagnet 20. Switch 24, for example, may be a relay enabled by means, not shown, or may be of a timer swich 25, as shown in FIG. 3, programmed to energize electromagnet 20 at a specific time or after a predetermined interval from the time system 10 is deployed. Energy to enable switch 24 and to power any timer could be provided by a small battery, as would be readily understood by those skilled in this technology. Float 14 is positioned adjacent to housing 18 so that permanent magnet 12 is positioned sufficiently close to electromagnetic core 21 of electromagnet 20 so that core 21 is magnetically attracted to permanent magnet 12. The magnetic force provided by permanent magnet 12 acting upon core 21 must be sufficient to overcome the buoyant force provided by float 14 when submerged in an aqueous environment. Upon enablement of switch 24, electrical power is provided to electromagnet 20, causing reversal of its magnetic field. This field reversal repels permanent magnet 12, allowing float 14 to rise upwardly towards the ocean surface. As float 14 ascends, flexible line 16 pays out from spool 17. Of course, the buoyant force of float 14 must be sufficient to overcome any negative buoyancy of flexible line 16 and permanent magnet 12. Of course, line 16 may be of a type that is buoyantly neutral.

Optionally, corrodible link 26 may be positioned to hold float 14 to housing 18 in order to prevent unintended release of float 14 from housing 18, especially during handling and deployment operations. Corrodible links are well known by those skilled in this field of technology. Link 26 corrodes at a generally predetermined rate, suitable for the specific requirements of any particular application, after being immersed in the ocean to assure deployment of system 10 to its destination before float 14 is capable of being released.

Float release 10 may be attached or incorporated into such devices as underwater sensors or lobster traps.

Obviously, many modifications of the present invention are possible in light of the above teachings. It is therefore to be understood that within the scope of the appended claims, the invention may be practiced otherwise than as specifically described.

We claim:
1. A marker float release, comprising:
   a housing;
   an electromagnet mounted to said housing, said electromagnet having an electromagnetic core;
   a buoyant element having a permanent magnet, said buoyant element being positioned against said housing so that said permanent magnet is magnetically attracted to said electromagnetic core with sufficient force to hold said buoyant element adjacent to said housing when said housing and said buoyant element are submerged in water by inducing a magnetic field in said electromagnetic core;
   a flexible line having one end attached to said buoyant element and another end attached to said housing; and
   magnetic field reversing means operably coupled to said electromagnet for selectively reversing said magnetic field of said electromagnetic core thereby permitting said buoyant element to be released from said housing.
2. The marker float release of claim 1 wherein said magnetic field reversing means includes:
   an electrical power source selectively coupled to said electromagnet; and
   a normally open electrical switch operably coupled between said electromagnet and said electrical power source.
3. The marker float release of claim 2 wherein:
   said electrical power source is a battery.
4. The marker float release of claim 3 wherein:
   said switch is enabled by a timer.
5. The marker float release of claim 2 wherein:
   said electrical power source is a pre-charged capacitor circuit.
6. The marker float release of claim 5 wherein:
   said switch is enabled by a timer.

* * * * *

UNITED STATES PATENT AND TRADEMARK OFFICE
CERTIFICATE OF CORRECTION

PATENT NO. : 5,100,353
DATED : March 31, 1992
INVENTOR(S) : James H. Dombrowski and William H. Marn It is certified that error appears in the above-identified patent and that said Letters Patent is hereby corrected as shown below:

On the title page, Item [75]:
Change: "Domborwski" to --Dombrowski-- in two instances on cover page.

Signed and Sealed this

Fourteenth Day of June, 1994

*Attest:*

BRUCE LEHMAN

*Attesting Officer*     *Commissioner of Patents and Trademarks*